United States Patent
Chan et al.

(10) Patent No.: US 7,343,181 B2
(45) Date of Patent: Mar. 11, 2008

(54) WIRELESS COMMUNICATION DEVICE HAVING ELECTROMAGNETIC COMPATIBILITY FOR HEARING AID DEVICES

(75) Inventors: Yiu K. Chan, Vernon Hills, IL (US); Joselito C. Gavilan, Elk Grove Village, IL (US); Jin D. Kim, Pleasant Prairie, WI (US)

(73) Assignee: Motorola Inc., Schaumburg, IL (US)

( * ) Notice: Subject to any disclaimer, the term of this patent is extended or adjusted under 35 U.S.C. 154(b) by 421 days.

(21) Appl. No.: 11/199,298

(22) Filed: Aug. 8, 2005

(65) Prior Publication Data

US 2007/0032271 A1    Feb. 8, 2007

(51) Int. Cl.
*H04B 1/38* (2006.01)

(52) U.S. Cl. ............... 455/575.3; 455/90.3; 379/52
(58) Field of Classification Search ............... None
See application file for complete search history.

(56) References Cited

U.S. PATENT DOCUMENTS

| | | |
|---|---|---|
| 5,692,046 A | 11/1997 | Jambhekar |
| 5,832,079 A | 11/1998 | Rabe |
| 6,052,464 A | 4/2000 | Harris et al. |
| 6,064,894 A | 5/2000 | Zurek et al. |
| 6,104,808 A | 8/2000 | Alameh et al. |
| 6,104,916 A * | 8/2000 | Steinhoff et al. ........ 455/575.3 |
| 6,405,019 B1 | 6/2002 | Murray |
| 6,453,045 B1 | 9/2002 | Zurek et al. |
| 6,758,303 B2 | 7/2004 | Zurek et al. |
| 2003/0040345 A1 | 2/2003 | Berger et al. |
| 2005/0153727 A1 | 7/2005 | Li |

OTHER PUBLICATIONS

U.S. Appl. No. 11/170,358, filed Jun. 29, 2005, Zurek et al.

* cited by examiner

*Primary Examiner*—Thanh Cong Le
(74) *Attorney, Agent, or Firm*—Hisashi D. Watanabe

(57) ABSTRACT

A wireless communication device for minimizing electromagnetic interference with hearing aid devices. The wireless communication device comprises a lower housing (112, 312, 412, 512, 612) and an upper housing (114, 314, 414, 514, 514) adjacent to the lower housing. The lower housing (112, 312, 412, 512, 612) supports a wireless transceiver (108, 202) capable of producing an electromagnetic field, and the upper housing includes an ear piece (104, 504, 604). For one embodiment the upper housing (114, 314, 514, 614) and all components supported by the upper housing consist of non-electromagnetic conductive material. For other embodiments, all electromagnetic conductive components of the upper housing (414, 514, 614) are restricted to an area adjacent to an ear piece (104, 504, 604) of the upper housing.

19 Claims, 6 Drawing Sheets

WIRELESS COMMUNICATION DEVICE HAVING ELECTROMAGNETIC COMPATIBILITY FOR HEARING AID DEVICES

FIELD OF THE INVENTION

The present invention relates generally to the field of wireless communication devices. More particularly, the present invention relates to a wireless communication device for compatible operation with hearing aid devices.

BACKGROUND OF THE INVENTION

The hearing impaired, i.e., people who use hearing aid devices, may experience unique problems with their wireless communication devices. In particular, interference between a wireless communication device and a hearing aid device may be heard by the hearing impaired person. A wireless communication device is considered to be incompatible with hearing aid devices if this interference occurs.

The interference occurs when electromagnetic pulses of transmitter circuitry of a wireless communication device cause an audible noise to be heard via a hearing aid device. The transmitter circuitry of certain phones may generate high electromagnetic energy levels at the ends of the wireless communication device. Since an ear piece of a wireless communication device is commonly position at one end of the device, a hearing aid device worn by a hearing impaired person would be situated adjacent to one end of the device during a call. The high electromagnetic energy level subjected to the hearing aid device degrades the sensitivity and sound quality of the device, causing audible noise to be heard by the hearing impaired person, thus interfering with that person's use of the device.

One solution for achieving hearing aid compatibility is to reduce a wireless communication device's radiation performance significantly which, as a result, would adversely reduces the radiation performance of the device. Another solution is to provide shielding on the hearing aid devices to protect them from any interference, but this burden on the hearing impaired may not be practical or desirable. Thus, there is a need for a wireless communication device that minimizes electromagnetic interference with hearing aid devices while minimizing any adverse effects to the radiation performance of the wireless communication device.

DETAILED DESCRIPTION OF THE PREFERRED EMBODIMENTS

Figure 1:
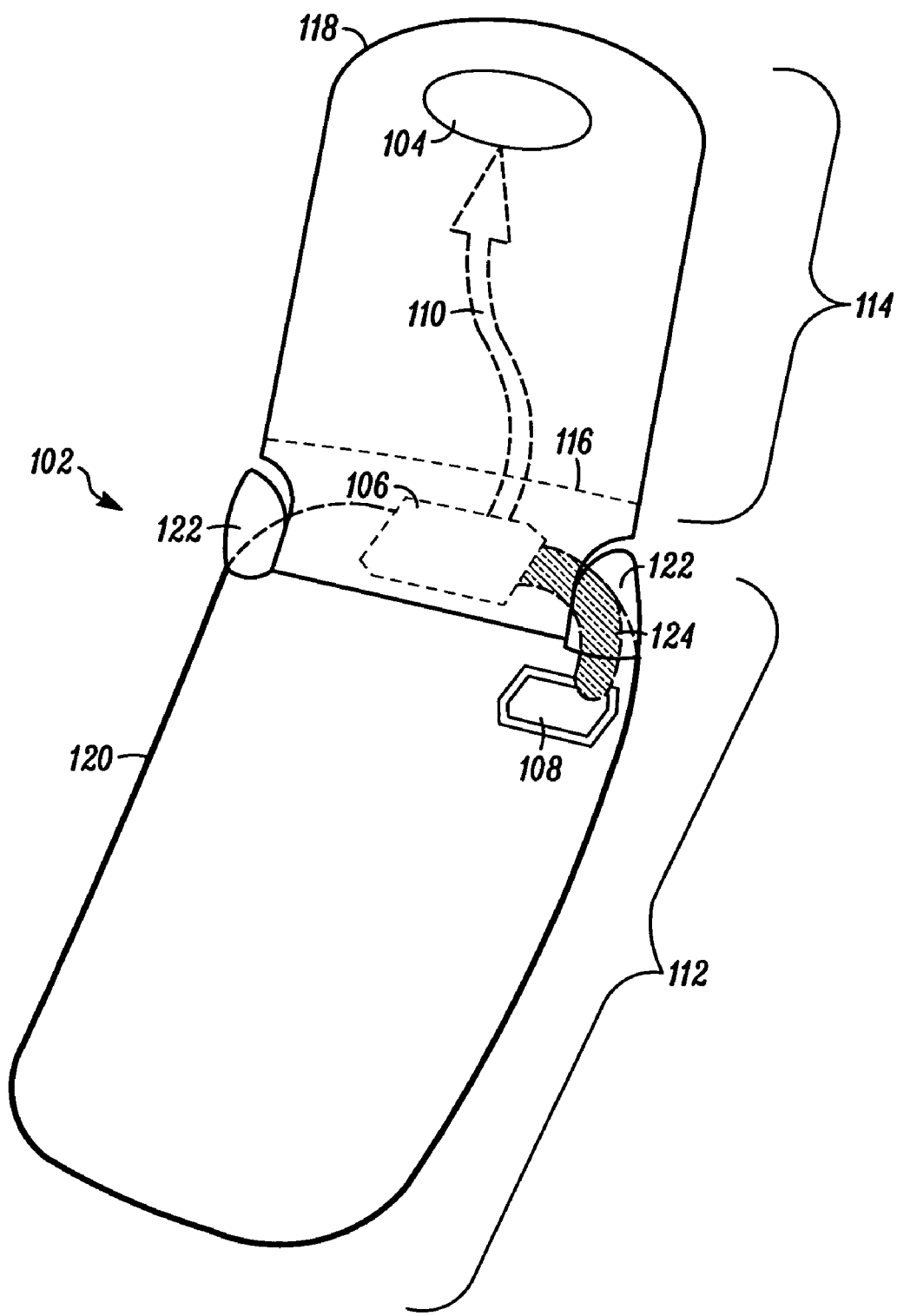
FIG. 1 is a schematic view of an embodiment in accordance with the present invention.

A wireless communication device, in accordance with the present invention, minimizes electromagnetic interference with hearing aid devices while minimizing any adverse effects to the radiation performance of the device. An upper portion of the wireless communication device includes an ear piece and, thus, the upper portion is the portion closest to a hearing aid device during a call. By controlling the material composition of the upper portion of the wireless communication device, the electromagnetic energy level at the ear piece may be minimized. In particular, electromagnetic energy levels may be minimized at areas where non-electromagnetic conductive materials, such as non-metallic materials, are used. Electromagnetic conductive materials should not exist, or should be minimized, at all parts of the upper portion, including the housing of the upper portion itself as well as all components supported and/or enclosed by the upper portion of the housing. As a result, high levels of electromagnetic energy levels may be repositioned at another location of the device, away from the ear piece and corresponding hearing aid device.

The wireless communication device in accordance with the present invention may communicate with a wireless communication network or other wireless communication devices via a variety of wireless communication technologies including, but are not limited to, cellular-based communications such as analog communications (using AMPS), digital communications (using CDMA, TDMA, GSM, iDEN, GPRS, or EDGE), and next generation communications (using UMTS, WCDMA or CDMA2000) and their variants; a peer-to-peer or ad hoc communication technology such as HomeRF, Bluetooth and IEEE 802.11 (a, b or g); and other forms of wireless communication such as infrared technology. For example, the wireless communication device may include a wireless transmitter capable of operating between an 800 MHz to 960 MHz frequency range of a cellular communication system.

The present invention also provides desirable radiation performance. By providing a non-electromagnetic conductive composition between the ear piece and the wireless transceiver, normal signal linkage is broken. There are a variety of embodiments to establish the signal link. For one embodiment, an acoustic transducer is coupled to the location of the ear piece via a connecting passage transferring audio or sound. For another embodiment, the signal transmission may be provided by optical signal transmission and optical transducers. For yet another embodiment, the acoustic transducer may communicate with the ear piece via a low power, short-range technology, such as Bluetooth. For still another embodiment, which may be combined with one or more of the above embodiments, the area adjacent to the earpiece may have one or more transducers requiring power and, thus, include a portable power source, such as a battery. The battery may be rechargeable and may receive charge current from a main power source of the wireless communication device.

One aspect of the present invention is a wireless communication device for minimizing electromagnetic interference with hearing aid devices comprising a lower housing, an upper housing adjacent to the lower housing, and a passage coupled components of the lower and upper housings. The lower housing supports a wireless transceiver capable of producing an electromagnetic field and an acoustic transducer. The upper housing includes an ear piece, and the upper housing and all components supported by the upper housing consist of non-electromagnetic conductive material. The passage couples the acoustic transducer of the lower housing to the ear piece of the upper house.

Another aspect of the present invention is a wireless communication device comprising a lower housing supporting a wireless transceiver and an upper housing adjacent to the lower housing, in which all electromagnetic conductive components of the upper housing are restricted to an area adjacent to an ear piece of the upper housing.

Referring to FIG. 1, a wireless communication device 100 in accordance with the present invention may have a variety of form factors (as described below), as well as a variety of different components and function. For the embodiment shown in FIG. 1, the wireless communication device 100 includes a housing 102 having an ear piece 104, an acoustic source or transducer 106 supported by the housing and distal from the ear piece, and various other components 108. It is to be understood that the ear piece 104, as referenced herein, is a designated area of the housing 102 of the wireless communication device for receiving an ear of a user. Also, for this embodiment, the wireless communication device 100 includes a passage 110 that couples the ear piece 104 to the acoustic transducer 106. The passage may communicate between the ear piece 104 and the acoustic transducer 106 via one of gas, liquid or solid material.

As shown in FIG. 1, the housing 102 of the wireless communication device 100 comprises a lower housing 112 and an upper housing 114 adjacent to the lower housing. The lower housing 112 supports one or more wireless transceivers (represented as one of the other components 108) capable of producing an electromagnetic field and the acoustic transducer 106. The upper housing 114, and all components supported by the upper housing, consist of non-electromagnetic conductive material. The division 116 between the lower and upper housings 112, 114 is defined by the electromagnetic characteristics of the wireless communication device 100. In particular, the division 116 is selected at a location of the wireless communication device 100 for minimizing electromagnetic interference with a hearing aid device located near the ear piece 104.

Accordingly, the designations of lower and upper housings 112, 114, should not be confused with lower and upper chassis 118, 120 of the flip-phone or clam-shell form factor shown in FIG. 1. The embodiment shown in FIG. 1 exemplifies a form factor of the wireless communication device 100 in which a lower chassis 118 is coupled to an upper chassis 120 via a hinge 122. For this form factor, a flex cable 124 may be threaded through the hinge 122 to connect components of the lower chassis 118, such as component(s) 108, to components of the upper chassis 120, such as acoustic transducer 106.

As described above, the division 116 is selected to minimize electromagnetic interference with a hearing aid device located near the ear piece 104, i.e., distance the interference field to the hearing aid device. For example, to meet certain FCC Hearing Aid Compatibility ("HAC") requirements, the minimum spacing to acoustic outlet or ear piece 104 may be a quarter wavelength, which is a function of frequency. The actual location of the division 116 varies based on the level of hearing aid interference that is considered to be acceptable.

Figure 2:
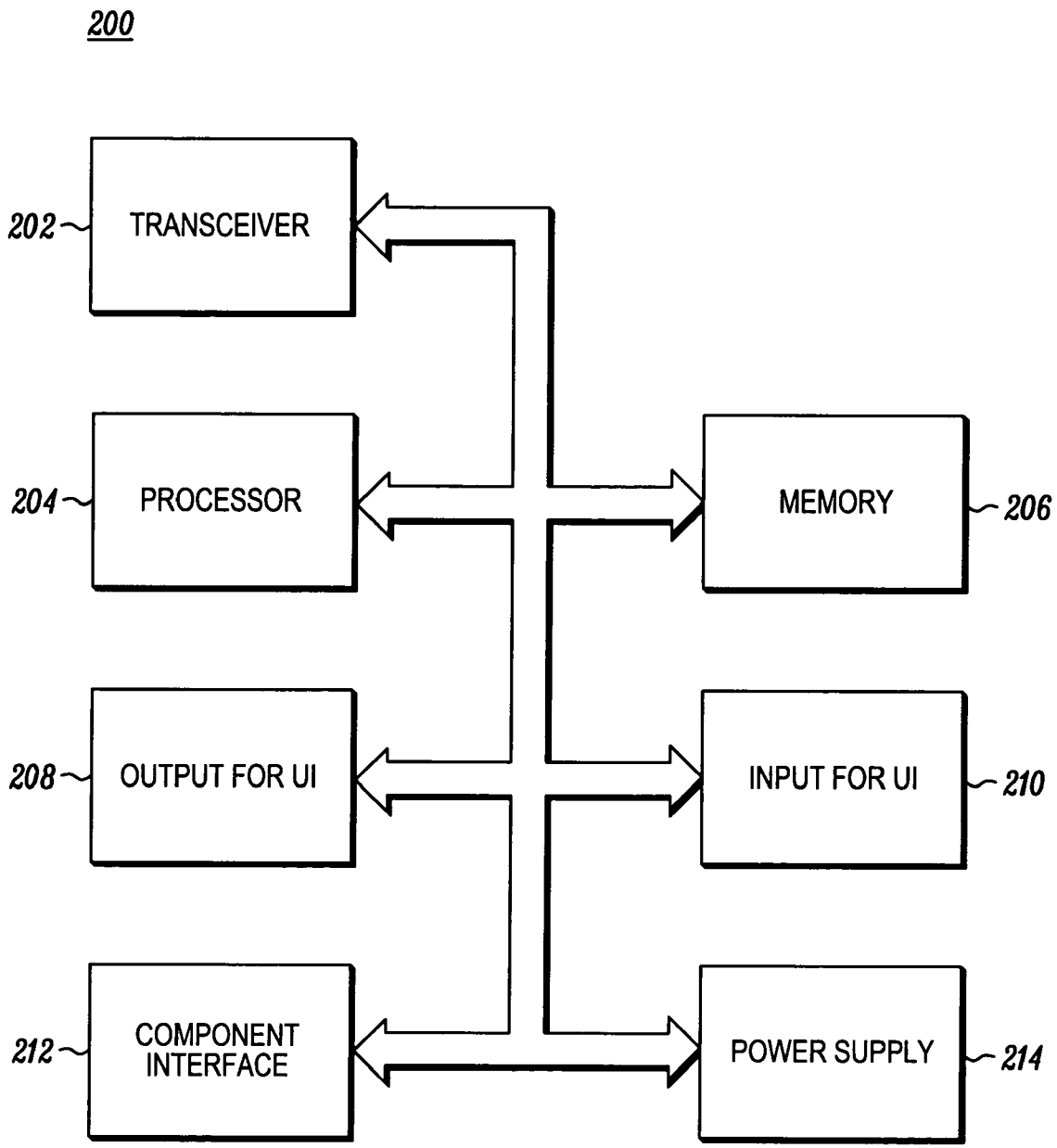
FIG. 2 is a block diagram of exemplary components of a wireless communication device in accordance with the present invention.

Referring to FIG. 2, there is provided exemplary internal components 200 of a wireless communication device 100. The exemplary internal components 200 include one or more wireless transceivers 202, a processor 204, a memory portion 206, and a user interface. The user interface includes one or more output devices 208 and one or more input devices 210. Each transceiver 202 may utilize wireless technology for communication, such as the wireless communication technologies described above. Also, at least one antenna coupled to one or more wireless transceivers 202 may be supported, in its entirety, by the lower housing of any embodiment. The internal components 200 may further include a component interface 212 to provide a direct connection to auxiliary components or accessories for additional or enhanced functionality. The internal components 200 preferably include a power supply 214, such as a battery, for providing power to the other internal components while enabling the wireless communication device 100 to be portable. For example, the power supply 214 may used to recharge components adjacent to the ear piece for certain embodiments.

The input and output devices 208, 210 of the internal components 200 may include a variety of visual, audio and/or mechanical outputs. For example, the output device(s) 208 may include a visual output device such as a liquid crystal display and light emitting diode indicator, an audio output device such as a speaker, alarm and/or buzzer, and/or a mechanical output device such as a vibrating mechanism. Likewise, by example, the input devices 210 may include a visual input device such as an optical sensor (for example, a camera), an audio input device such as a microphone, and a mechanical input device such as a flip sensor, keyboard, keypad, selection button, touch pad, touch screen, capacitive sensor, motion sensor, and switch. Actions that may actuate one or more input devices 210 include, but not limited to, opening the wireless communication device, unlocking the device, moving the device to actuate a motion, moving the device to actuate a location positioning system, and operating the device. For the present invention, most output and input devices 208, 210, if not all, would be situated away from the ear piece of the wireless communication device 100 in order to minimize electromagnetic interference with hearing aid devices situated near the ear piece.

Figure 3:
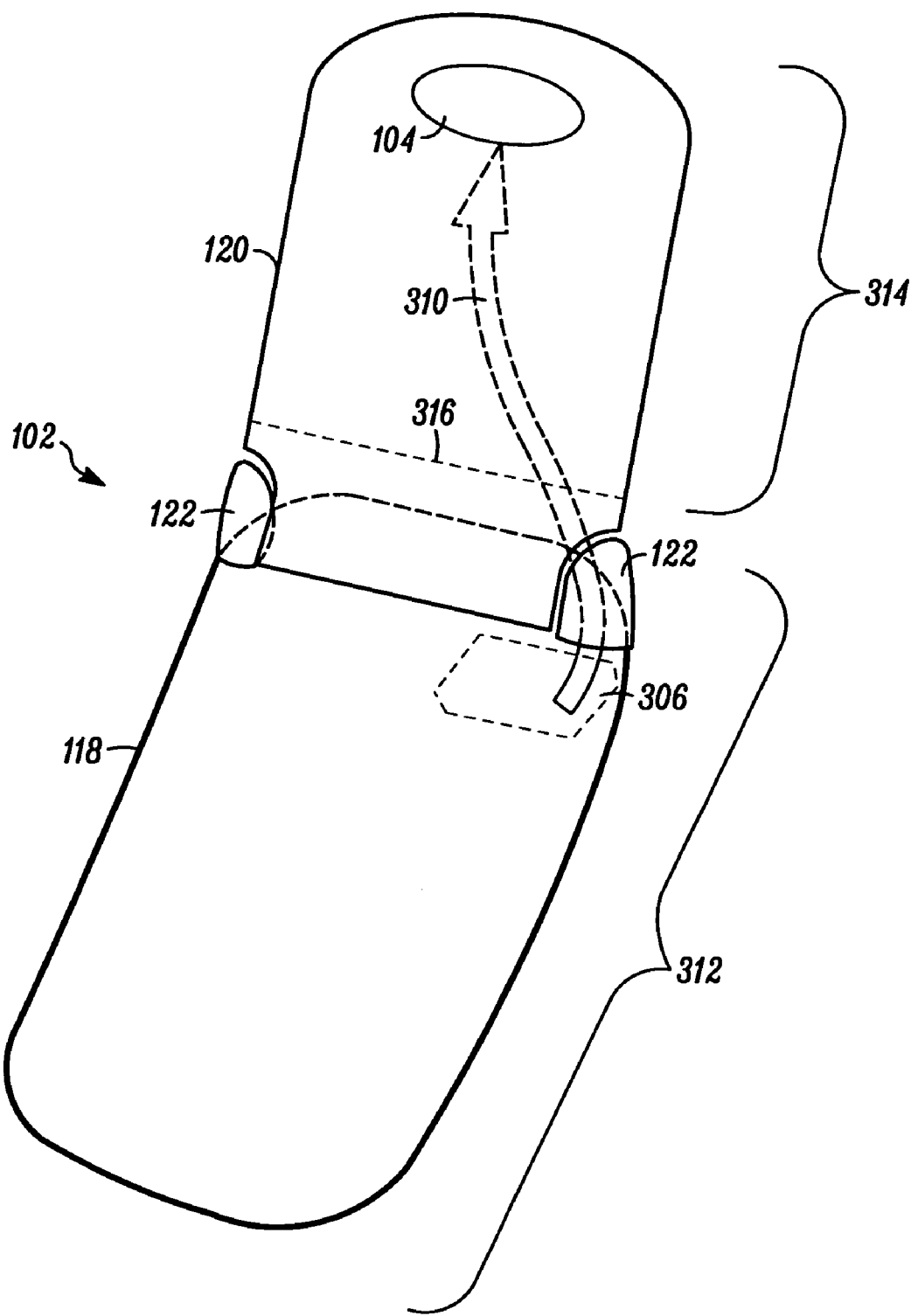
FIG. 3 is a schematic view of another embodiment in accordance with the present invention.

Referring to FIG. 3, there is shown another wireless communication device 300 that is in accordance with the present invention. Similar to the embodiment shown in FIG. 1, the wireless communication device 300 includes a housing 102, an ear piece 104, an acoustic source or transducer 306, and various other components (not shown). The housing 102 of the wireless communication device 300 comprises a lower housing 312, an upper housing 314 adjacent to the lower housing, and a division therebetween 316. Although the division 316 of FIG. 3 is shown at a position similar to the division 116 of FIG. 1, it is permissible for it to be at different position, so long as the upper housing 314 and all components supported by the upper housing consist of non-electromagnetic conductive material, and electromagnetic interference with any hearing aid device located near the ear piece 104 is minimized.

Similar to FIG. 1, the embodiment shown in FIG. 3 exemplifies a flip-phone or clam-shell form factor in which a lower chassis 118 is coupled to an upper chassis 120 via a hinge 122. For this particular embodiment, the acoustic transducer 306 of the wireless communication device 300 is located at, and supported by, the lower chassis 118. Also, a passage 310 that couples the ear piece 104 to the acoustic transducer 306 is threaded through the hinge 122 to connect the acoustic transducer to components of the upper chassis 120, such as the ear piece 104. Since the acoustic transducer 306 is supported by the lower chassis 118, the division 316 may be located anywhere between the ear piece 104 and the acoustic transducer 306 so long as electromagnetic interference with any hearing aid device located near the ear piece 104 is minimized. For example, the division 316 could correspond to the hinge 122 between the lower and upper chassis 118, 120.

Figure 4:
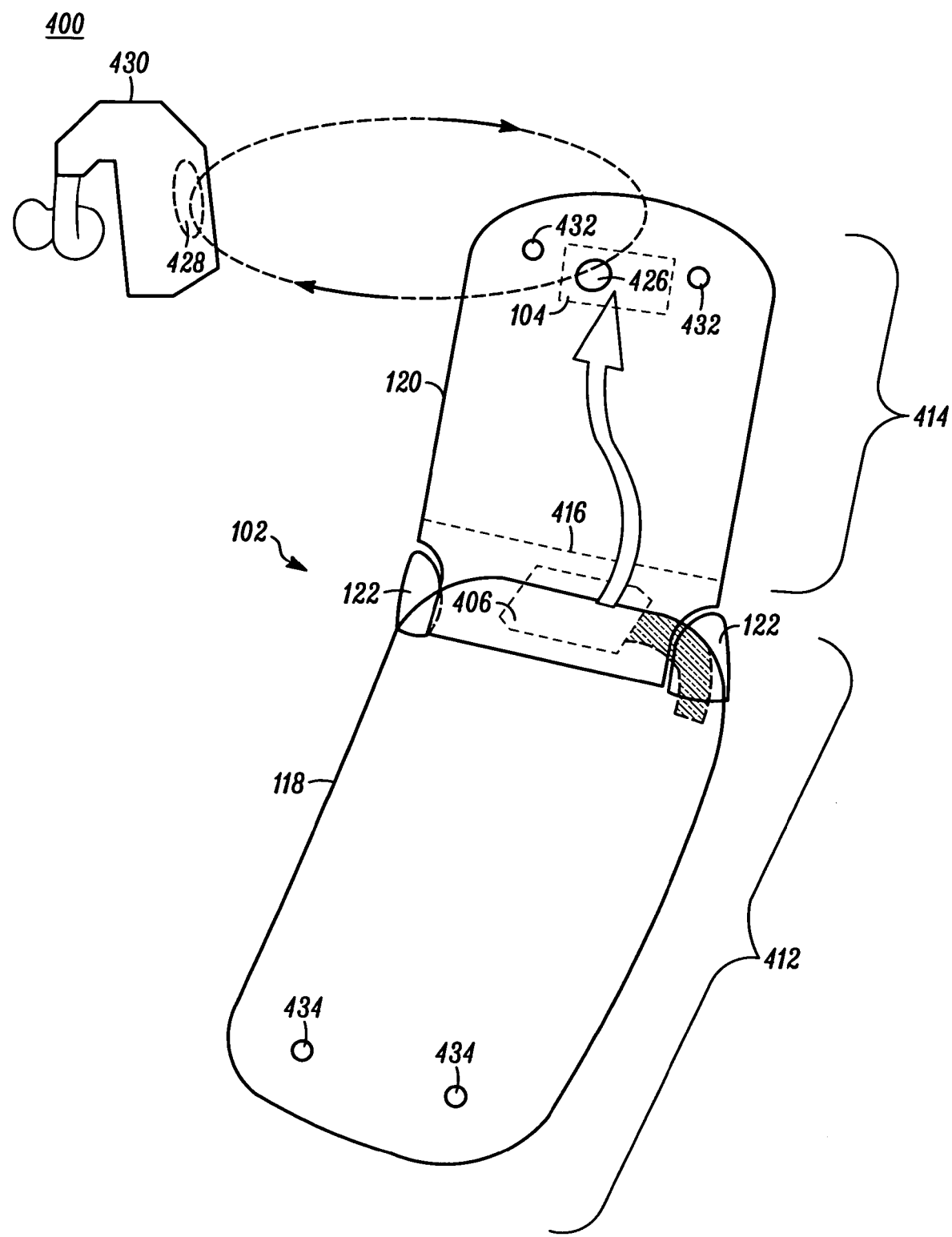
FIG. 4 is a schematic view of yet another embodiment in accordance with the present invention.

Referring to FIG. 4, there is shown a third embodiment in accordance with the present invention. Similar to the embodiments shown in FIGS. 1 and 3, the wireless communication device 400 includes a housing 102, an ear piece 104, an acoustic source or transducer 406, and various other components (not shown). The housing 102 of the wireless communication device 400 comprises a lower housing 412, an upper housing 414 adjacent to the lower housing, and a division therebetween 416. Further, a lower chassis 118 is coupled to an upper chassis 120 via a hinge 122. Although this third embodiment, as shown in FIG. 4, provides the acoustic transducer 406 at the lower chassis 118, it is to be understood that this third embodiment is also applicable to other positions for the acoustic transducer, such as the position at the upper chassis 120 shown in FIG. 1.

For this third embodiment, all electromagnetic conductive components of the upper housing 414 are restricted to an area adjacent to the ear piece 104. Thus, in contrast to the previous embodiments, the third embodiment includes one or more electromagnetic conductive components at a particular area of the upper housing 414, namely the area adjacent to the ear piece 104. So long as the quantity and size of the electromagnetic conductive components are limited, electromagnetic interference with any hearing aid device may still be minimized. For example, the upper housing 414 includes a magnetic transducer 426 that is capable of communicating with a tele-coil 428 in a hearing aid device 430 of a person with impaired hearing, when the hearing aid device 430 is within proximity of the ear piece 104 (and, thus, the magnetic transducer). Accordingly, by communicating between the magnetic transducer 426 and the tele-coil 428 of the hearing aid device 430 via magnetic signals, communication to the hearing aid device 430 may be improved since ambient noise is minimized. The magnetic transducer 426 and the audio transducer 406 may switch operation so that only one device operates at any given time, or both transducers may operate together.

Magnetic transducers often require a power source, so a portable power source may also need to be located at the area adjacent to the ear piece 104. The portable power source of the magnetic transducer 426 may be rechargeable. For one embodiment, the portable power source may be recharged by an external source at the same time that the main power supply 214 of the wireless communication device 400 is charged. For another embodiment, the portable power source may be recharged by the main power supply 214, such as, when the magnetic transducer is not driving, or otherwise communicating with, the tele-coil 428 of the hearing aid device 430. As shown in FIG. 4, the upper chassis 118 may include one or more terminals 432 connected to the portable power supply and the lower chassis 120 may include one or more corresponding terminals 434. When a call is in progress, the wireless communication device 400 may be open so that the terminals 432 and the corresponding terminals 434 are apart. When the wireless communication device 400 is closed, the terminals 432 and the corresponding terminals 434 may be in contact with each other so that the main power supply 214 may charge the portable power supply.

In the alternative, the wireless communication device 400 may include a first short-range receiver or transceiver located in the area adjacent to the ear piece 104 of the upper housing 120, and a second short-range transmitter or transceiver located in the lower housing 118. One or more components of the upper housing 120 located in the area adjacent to the ear piece 104 may communicate with one or more components of the lower housing 118 via the first short-range receiver and the second short-range transmitter. For example, acoustic information may be communicated between the ear piece 104 and the acoustic transducer 406 via RF communication. Similar to magnetic transducers, short-range transmitter and receiver often require a power source, so a portable power source may be needed at the area adjacent to the ear piece 104. An example of a short-range transmitter, receiver or transceiver includes, but is not limited to, a Bluetooth transmitter, receiver or transceiver.

Figure 5:
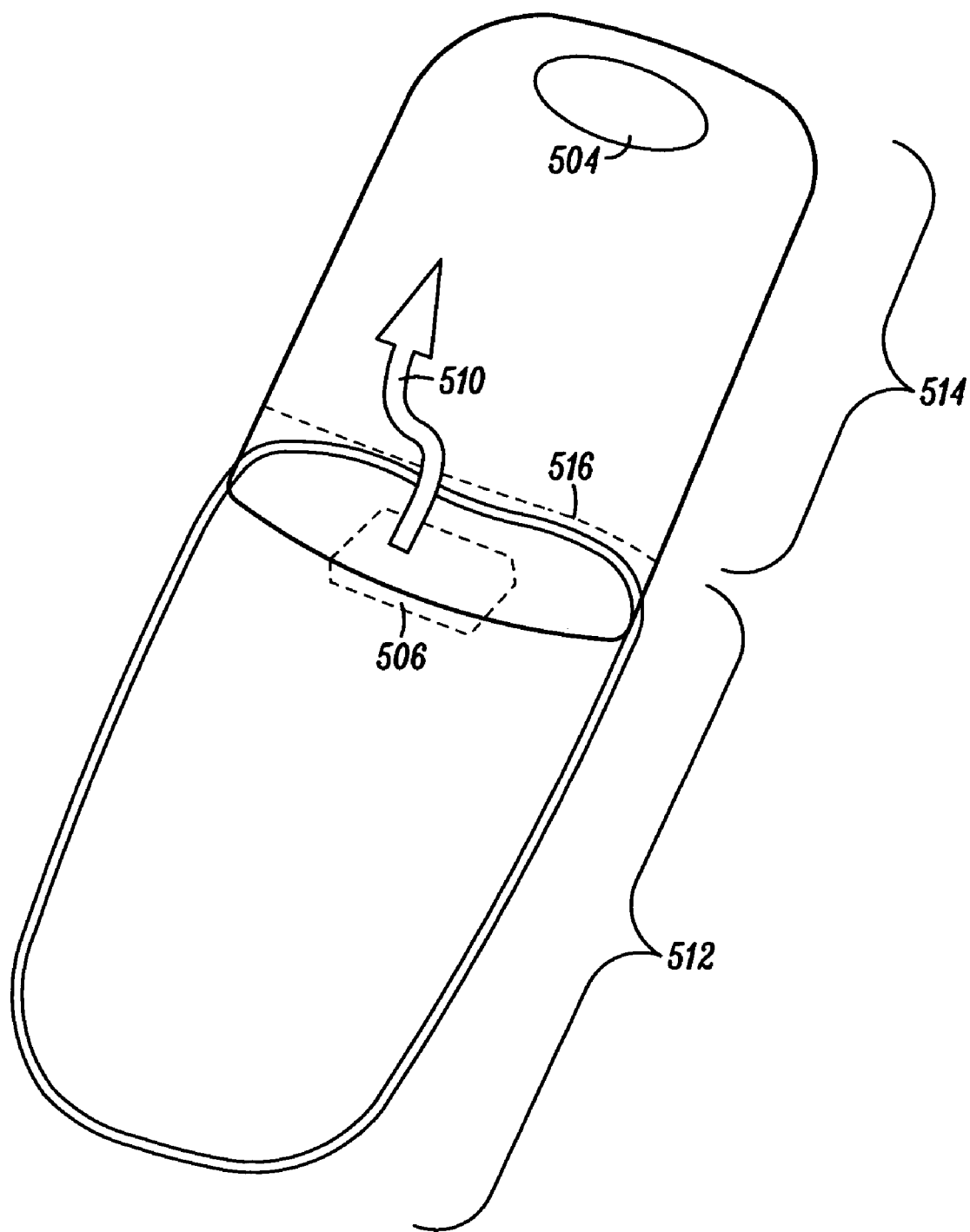
FIG. 5 is a schematic view of still another embodiment in accordance with the present invention.
Figure 6:
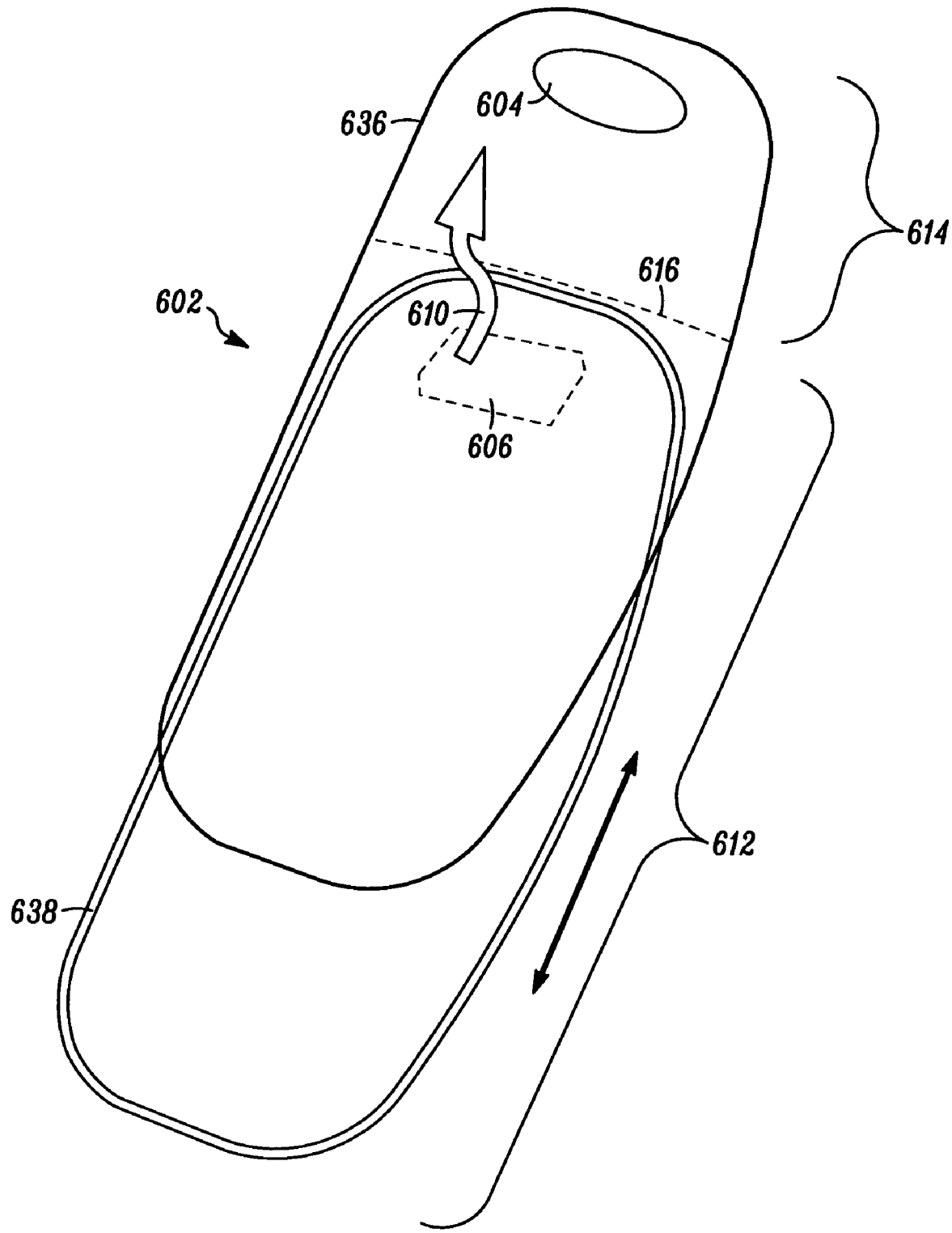
FIG. 6 is a schematic view of a further embodiment in accordance with the present invention.

Referring to FIGS. 5 and 6, there are provided wireless communication devices 500, 600 in accordance with the present invention. FIG. 5 represents a wireless communication device 500 having a candy-bar form factor, and FIG. 6 represents a wireless communication device 600 having a slider form factor in which one part 636 of the housing slide in parallel relative to another part 638 of the housing. Both devices 500, 600, include an ear piece 504, 604, an acoustic transducer 506, 606, and a passage 510, 610 connecting the ear piece to the acoustic transducer. The wireless communication devices 500, 600 comprise a lower housing 512, 612, an upper housing 514, 614 adjacent to the lower housing, and a division therebetween 516, 616. For the slider form factor of the wireless communication device 600 shown in FIG. 6, the lower and upper housing 612, 614 designations apply to only one part 636 of the housing, and the other part 638 of the housing, in its entirety, is considered to be part of the lower housing. For example, as shown in FIG. 6, the upper housing 614 is an upper portion of only one part 636, whereas the remainder of the wireless communication device 600 is the lower housing 612. It is to be understood that the present invention applies to a wide variety of form factors, such as rotator and full-keyboard form factors, and is not limited to the form factors shown and described herein.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A wireless communication device for minimizing electromagnetic interference with hearing aid devices comprising:
   a lower housing supporting a wireless transceiver and an acoustic transducer, the wireless transceiver being capable of producing an electromagnetic field;
   an upper housing, adjacent to the lower housing, including an ear piece, the upper housing and all components supported by the upper housing consisting of non-electromagnetic conductive material; and
   a passage coupling the acoustic transducer of the lower housing to the ear piece of the upper house.

2. The wireless communication device of claim 1, wherein the ear piece of the upper housing is distal to the acoustic transducer.

3. The wireless communication device of claim 1, wherein a minimum distance between the acoustic transducer and the ear piece is about a quarter wavelength, which is a function of an operating frequency of the wireless transceiver.

4. The wireless communication device of claim 1, further comprising at least one antenna coupled to the wireless transceiver and supported, in its entirety, by the lower housing.

5. The wireless communication device of claim 1, wherein the wireless transmitter is capable of operating between an 800 MHz to 960 MHz frequency range of a cellular communication system.

6. The wireless communication device of claim 5, wherein the cellular communication system is a Global System of Mobile Communications ("GSM") system.

7. The wireless communication device of claim 1, wherein the passage communicates between the acoustic transducer and the ear piece via one of gas, liquid or solid material.

8. A wireless communication device for minimizing electromagnetic interference with a hearing aid device comprising:
  a lower housing supporting a wireless transceiver capable of producing an electromagnetic field; and
  an upper housing, adjacent to the lower housing, including an ear piece, all electromagnetic conductive components of the upper housing being restricted to an area adjacent to the ear piece.

9. The wireless communication device of claim 8, wherein the upper housing supports a magnetic transducer capable of generating a magnetic field to drive a tele-coil of the hearing aid device.

10. The wireless communication device of claim 9, wherein the magnetic transducer includes a portable power source.

11. The wireless communication device of claim 10, wherein the portable power source of the magnetic transducer is rechargeable when the magnetic transducer is not communicating with the tele-coil of the hearing aid device.

12. The wireless communication device of claim 8, wherein the upper housing supports an acoustic transducer capable of generating audio to the ear piece.

13. The wireless communication device of claim 8, wherein the lower housing supports an acoustic transducer capable of generating audio for the ear piece.

14. The wireless communication device of claim 13, further comprising a passage coupling the acoustic transducer of the lower housing to the ear piece of the upper house.

15. The wireless communication device of claim 8, further comprising a short-range receiver located in the area adjacent to the ear piece of the upper housing, and a short-range transmitter located in the lower housing.

16. The wireless communication device of claim 15, wherein one or more components of the upper housing located in the area adjacent to the ear piece communicates with one or more components of the lower housing via the short-range transmitter and the short-range receivers.

17. The wireless communication device of claim 8, further comprising at least one antenna coupled to the wireless transceiver and supported, in its entirety, by the lower housing.

18. The wireless communication device of claim 8, wherein the wireless transmitter is capable of operating between an 800 MHz to 960 MHz frequency range of a cellular communication system.

19. The wireless communication device of claim 18, wherein the cellular communication system is a Global System of Mobile Communications ("GSM") system.

* * * * *